RADIO FREQUENCY COAXIAL HIGH PASS FILTER

Filed Aug. 28, 1964

INVENTORS
JAMES W. BAILEY
DONALD F. McAFEE
BY
ATTORNEYS

United States Patent Office 3,393,384

Patented July 16, 1968

3,393,384
RADIO FREQUENCY COAXIAL HIGH PASS FILTER

James W. Bailey, Seabrook, and Donald F. McAfee, Annapolis, Md., assignors to the United States of America as represented by the Administrator of the National Aeronautics and Space Administration Filed Aug. 28, 1964, Ser. No. 392,969
6 Claims. (Cl. 333—73)

ABSTRACT OF THE DISCLOSURE

A high pass filter consisting of two cylindrical capacitors positioned concentrically of one another in a coaxial transmission line. The ratio of the inner diameter of the outer capacitor to the outer diameter of the inner capacitor insures impedance matching with the transmission line. In addition, the input and output leads of the inner conductor of the transmission line are connected to opposite plates of the inner capacitor and the input and output leads of the outer conductor of the transmission line are connected to opposite plates of the outer capacitor such that complete D.C. isolation is obtained.

The invention decribed herein may be manufactured and used by or for the Government of the United States of America for governmental purposes without the payment of any royalties thereon or therefor.

This invention relates generally to radio frequency coaxial filters, and more particularly to a coaxial high pass filter adapted for direction connection in a transmission line system to provide D.C. isolation and near infinite rejection of low frequency signals in the audio range, and is matched to the characteristic impedance of the transmission line system.

In communications and electrical transmission systems operating at radio frequencies and higher, it is often desirable, if not necessary, to utilize coaxial transmission lines to transmit the electrical signals. In many instances it is necessary to provide D.C. isolation and low frequency filtering between selected points in the system, and accordingly, a blocking capacitor and/or low frequency filtering means are inserted in the transmission system. For example, in laboratory measuring and instrumentation systems the equipment under test may be located in an enclosed environmental chamber and it is necessary to use a coaxial lead-in arrangement for the RF test signals which provides isolation between the D.C. and RF grounds to prevent undesirable ground loops. In addition, for accurate, interference-free data low frequency filtering (to reject signals of power line frequencies which may be picked up by the transmission line system) should be provided for the test signal. It should be apparent that there are numerous other instances wherein it is desirable to provide D.C. isolation and low frequency filtering between selected points of a coaxial transmission system operating at radio frequencies.

In order to prevent discontinuities that produce a high voltage standing wave ratio (VSWR) and resulting losses by reflections and radiation any D.C. blocking or filtering device inserted in the transmission system should be matched to the characteristic impedance of the transmission line, and should itself introduce a low insertion loss in the system. Known prior art coaxial filters that provide low frequency rejection and are matched to the transmission line characteristic impedance do not provide D.C. isolation; and the insertion of a D.C. blocking capacitor, without more, produces a VSWR that is intolerable for many applications.

Accordingly, it is an object of the invention to provide a new and improved coaxial high pass filter for use at radio frequencies.

Another object of the invention is to provide an improved radio frequency coaxial high pass filter which may be directly connected in a transmission line system to provide D.C. isolation and a high degree of rejection of signals at audio frequencies.

A further object of the invention is to provide a novel radio frequency coaxial high pass filter which provides complete D.C. isolation and which may be readily matched to the characteristic impedance of input and output transmission lines.

Still another object of the invention is to provide a radio frequency coaxial high pass filter of the type described which is simple and compact in construction and reliable in operation.

Other objects, as well as the features and attending advantages of the invention will become apparent from the following description when taken in conjunction with the accompanying drawings, in which.

The radio frequency coaxial high pass filter of the present invention includes two cylindrical capacitors positioned coaxially of one another. Each capacitor comprises two flat, conductive plates that are separated by a dielectrical medium and rolled into a cylinder of one or more convolutions. Two coaxial connectors, constituting input and output terminals, are joined by conical shaped conductive members to the capacitor plates such that the inner conductor of the input and output coaxial connectors are respectively joined to opposite plates of the inner cylindrical capacitor and outer conductor of the input and output coaxial connectors are respectively joined to opposite plates of the outer cylindrical capacitor. This arrangement provides D.C. isolation and near infinite rejection of audio frequency signals while passing radio frequency signals. The ratio of the outer diameter of the inner cylindrical capacitor and the inner diameter of the outer cylindrical capacitor is proportioned such that the characteristic impedance of the coaxial section thereby formed matches the characteristic impedance of the transmission line connected to the input and output terminals, thus providing a low voltage standing wave ratio and minimizing losses. This characteristic impedance is also maintained in the conical conductive members providing transitions between the input and output coaxial connectors and the inner and outer cylindrical capacitors by the manner in which their conical surfaces are proportioned.

Figure 1:
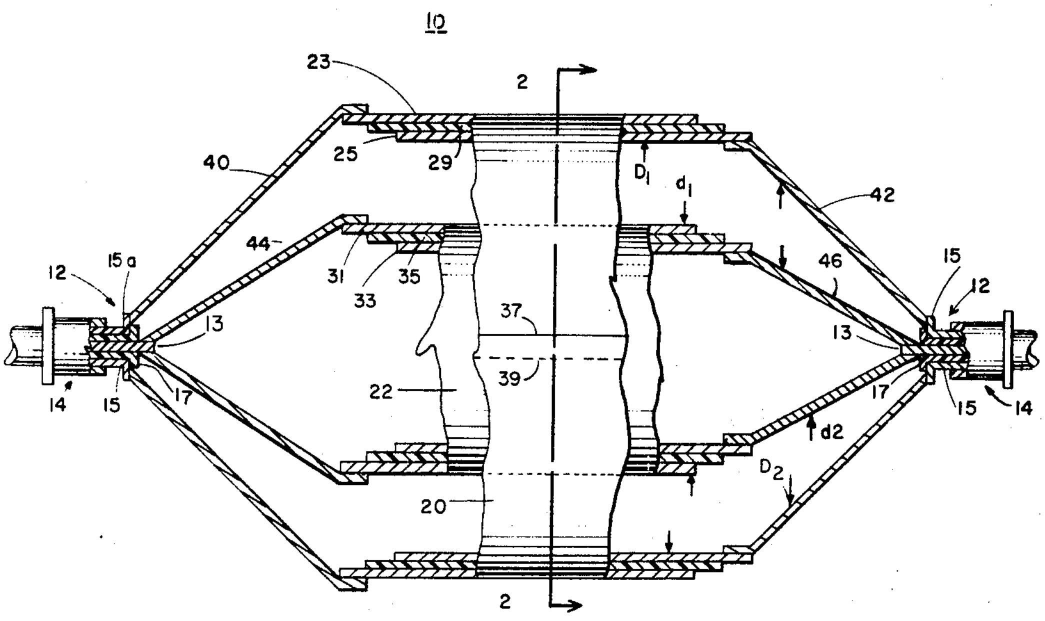
FIGURE 1 is a partial sectional view of the coaxial filter of the invention taken along the axis thereof.
Figures 2, 3:
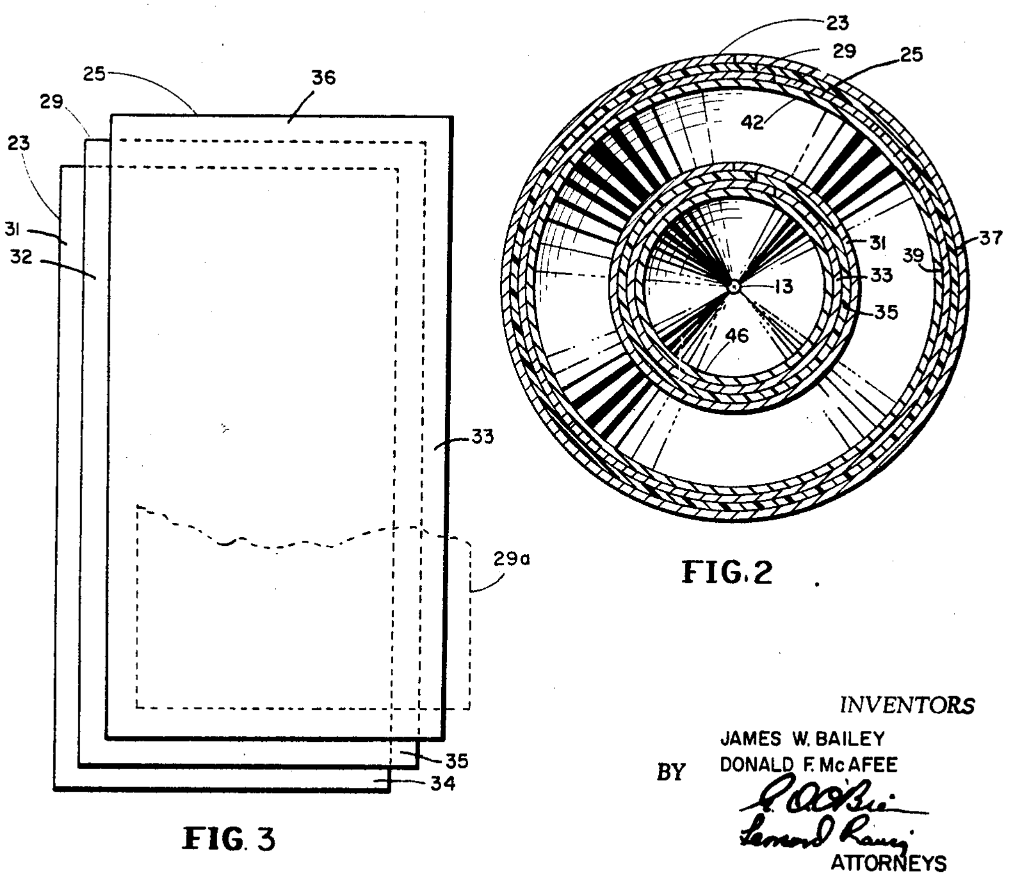
FIGURE 2 is a sectional view taken along lines 2—2 of FIGURE 1.
FIGURE 3 is a plain view of the capacitors used in the filter of the invention prior to assembly to facilitate an understanding of the construction thereof.

Referring now specifically to FIGURES 1 and 2, the coaxial filter shown generally at 10 includes coaxial connectors 12 at each end thereof. Each connector 12 has an inner conductor 13 and an outer conductor 15, separated by an insulating bead 17. Outer conductor 15 also has a flanged portion 15a. A coaxial line and mating connector, represented at 14, is utilized to provide input and output connections to filter 10. It is to be understood that filter 10 is a reciprocal device and connector 12 at either end thereof may be considered either an input or an output terminal. Preferably, although not limiting, coaxial connectors 12 may be a standard coaxial connector (such as a BNC connector or a type-N connector) that has been modified so that conical conductive member, to be subsequently described, may be joined to the inner and outer conductors thereof.

Filter 10 also includes cylindrical capacitors 20 and 22, with capacitor 20 of a larger diameter than capacitor 22 and positioned coaxially around capacitor 22. Capacitor 20 is made up of an outer conductive plate 23, an inner conductive plate 25, and a dielectric layer 29 disposed therebetween. Similarly, capacitor 22 is formed of outer conductive plate 31 and inner conductive plate 33, with dielectric layer 35 disposed therebetween. Conductive plates 23, 25, 31 and 33 may, for example, consist of a thin brass plate (in the order of .10 inch thick) that has been silver plated, and dielectric layers 29 and 35 may be a sheet Teflon of approximately .005 inch thick. Although illustratively shown as being rolled one time in FIGURES 1 and 2 for simplicity of the drawing, it is to be understood that each capacitor 20 and 22 may be rolled two or more times. In this latter instance, an additional dielectric layer 29*a* (FIGURE 3), having the same dimensions as dielectric layer 29 and positioned similarly with respect to conductive plates 23 and 25, is further provided to present suitable insulation between the conductive plates for subsequent convolutions.

In forming capacitors 20 and 22 the dielectric layer is positioned between two metallic plates (as shown in FIGURE 3) and this arrangement is subsequently rolled into a cylinder of the desired diameter. The metallic sheet and dielectric layer of FIGURE 3 may be rolled one, two, three or more times depending on the capacitance value for a given diameter of the capacitors thereby provided that is desired. For many applications it is preferable that the inner and outer capacitors be of the same value, and accordingly the conductive plates and the dielectric layer for both are provided with the same cross-section area, with the inner capacitor rolled more times into a smaller diameter than the outer capacitor. For example, the capacitor plates and dielectric layer of FIGURE 3 may be rolled two times to provide outer capacitor 20 and three times to provide inner capacitor 22. The length of the resulting cylinder is not critical, this being an additional factor in determining the total value of capacitors 20 and 22.

Referring again to FIGURE 3 (wherein conductive plates 23 and 25 and dielectric layer 29 of capacitor 20 are illustratively shown) it is noted that prior to rolling the capacitor plates and the dielectric layer are displaced, one from the other, in two directions to provide margins 31–36. Stated another way, overlapping layers of conductive material and dielectric material are provided alternately, at both axial ends and axially along the side walls of the resulting cylinder. The mating metal edges of margin 31 and 33 extending longitudinally along the side walls may be joined by soldering, along seams 37 and 39, of the resulting cylinder. The conductive plates and dielectric layer of capacitor 22, of course, are rolled and joined in the same manner.

The overlapping metal portions provided by margins 34 and 36 at the axial ends of the cylinder provide isolation gaps so that the inner and outer conductors of coaxial connectors 12 may be respectively joined to opposite plates of capacitors 20 and 22 to provide D.C. isolation between the input and output terminals of the filter. To this end, a truncated conical fitting 40, which may also be formed of silver plated brass, has its large opening joined to the outer periphery of the overlapping portion of outer conductive plate 23 of capacitor 20, and its smaller opening joined to the outer conductor of coaxial connector 12. This may be conveniently achieved by soldering a lip on the large opening of truncated conical fitting 40 to the margin on one axial end of outer conductive plate 23 and soldering the edge of the inner opening of truncated conical fitting 40 to flanged portion 15*a* on coaxial fitting 12. In a similar manner, truncated conical fitting 42 joins inner conductive plate 25 of capacitor 20 to the outer conductor of coaxial connector 12 at the other end of filter 10. It may be noted, therefore, that coaxial fittings 12 at opposite ends of filter 10 have their outer conductor connected to opposite plates of capacitor 20, and accordingly there is no D.C. path between the outer conductors of the coaxial connectors 12 at the opposite ends of filter 10.

Truncated conical fitting 44, which also may be formed of silver plated brass, joins inner conductor 13 of coaxial fitting 12 at one end of filter 10 to outer conductive plate 31 of capacitor 22. As previously mentioned, this may be achieved by a solder joint between conductor 13 and the small diameter of truncated conical fitting 44, and a solder joint between the overlapping portion of outer conductor 31 and a lip on the large opening of truncated conical fitting 44. In a similar manner, truncated conical fitting 46 joins inner conductor 13 of the other coaxial connector 12 (at the opposite end of filter 10) with inner conductive plate 33 of capacitor 22. Thus, in a manner similar to outer capacitor 20, inner capacitor 22 has one plate thereof connected to the inner conductor of coaxial fitting 12 at one end of filter 10 and the other plate thereof connected to the inner conductor of the coaxial fitting 12 at the opposite end of filter 10. This arrangement provides that there is no D.C. path between the inner conductors of the coaxial fittings at the opposite ends of filter 10.

The characteristic impedance of filter 10 is matched to that of coaxial lines 14 by proportioning the ratio of the diameter of inner conductive plate 25 of outer capacitor 20 to the diameter of outer conductive plate 31 of inner capacitor 22. At the same time, in order to provide a reflectionless transition between coaxial connectors 12 and capacitors 20 and 22, the walls of truncated conical fittings 40 and 44 and of truncated conical fittings 42 and 46, respectively, are tapered with respect to one another in the axial direction so that their spacing remains proportioned throughout the length of the transition. That is, the same ratio between the walls of the inner and outer conical fittings of each transition holds through the transition. Thus, with reference to FIGURE 1 the characteristic impedance ($Z_0$) of the filter at any cross-section taken along its axis may be expressed by:

$$Z_0 = K\frac{D_1}{d_1} = K\frac{D_2}{d_2} \quad (1)$$

where:

$D_1$ is the inside diameter of inner conductive plate 25 of outer capacitor 20, $d_1$ is the outside diameter of outer conductive plate 31 of inner capacitor 22, $D_2$ is the inside diameter (at a specified point in the axial direction) of truncated conical fittings 40 and 42, $d_2$ is the outside diameter (at the same specified point) of truncated conical fittings 44 and 46, and K is a constant of proportionality.

For a $Z_0$ of 50 ohms (nominal), and assuming an effective air dielectric between capacitors 20 and 22, Expression 1 above becomes:

$$Z_0 = 138 \log_{10}\frac{D_1}{d_1} = 138 \log_{10}\frac{D_2}{d_2} \quad (2)$$

The invention provides therefore a novel and improved coaxial filter that provides complete D.C. isolation and rejects signals at audio frequencies while providing a low impedance to radio frequency signals. The characteristic impedance filter of the invention may be readily matched to the characteristic impedance of the input and output transmission lines to minimize the voltage standing wave ratio and losses of the coaxial transmission system in which the filter is utilized.

While a preferred embodiment of the invention has been described with particularity, it should be apparent to those skilled in the art that certain modifications and alterations thereof are possible in light of the above teachings. It is therefore to be understood that within the scope of the appended claims, the invention may be practiced otherwise than as described herein.

What is claimed as new and desired to be secured by Letters Patent of the United States is:

1. A coaxial filter including in combination, first and second cylindrical capacitors, each said capacitor comprising at least one convolution of inner and outer conductive plates separated by a dielectric layer, said first cylindrical capacitor positioned coaxially within said second cylindrical capacitor, means for connecting the inner conductor of an input coaxial line to one axial end of one of said conductive plates of said first cylindrical capacitor, means for connecting the inner conductor of an output coaxial line to the other axial end of the other of said conductive plates of said first cylindrical capacitor, means for connecting the outer conductor of said input coaxial line to said one axial end of one of said conductive plates of said second cylindrical capacitor, and means for connecting the outer conductor of said output coaxial line to said other axial end of the other of said conductive plates of said second cylindrical capacitor, with the ratio of the inner diameter of said second cylindrical capacitor to the outer diameter of said first cylindrical capacitor being such to provide a characteristic impedance substantially the same as the characteristic impedance of said input and output coaxial lines.

2. A coaxial filter including in combination, first and second cylindrical capacitors, said first cylindrical capacitor having a smaller outer diameter than the inner diameter of said second cylindrical capacitor, with said first cylindrical capacitor being positioned coaxially within said second cylindrical capacitor, each of said first and second cylindrical capacitor, each of said first and second cylindrical capacitors comprising at least one convolution of inner and outer conductive plates separated by a dielectric layer, first and second terminal means positioned beyond the axial ends of said coaxially disposed cylindrical capacitors, said terminal means each having inner and outer conductors and adapted to receive a coaxial transmission line, first and second truncated cones of conductive material respectively connecting the inner conductor of one of said terminal means to one of said conductive plates of said first capacitor and the inner conductor of the other of said terminal to the other of said conductive plates of said first capacitor, third and fourth truncated cones of conductive material respectively connecting the outer conductor of one of said terminal means to one of said conductive plates of said second capacitor and the outer conductor of the other of said terminal means to the other of said conductive plates of said second capacitor, with the ratio of the diameters of the outer conductive plate of said inner capacitor and the inner conductive plate of said outer capacitor being such to provide a characteristic impedance for the coaxial filter substantially equal to that of the coaxial transmission line connected to said terminal means.

3. A high-pass filter including in combination, a first cylindrical capacitor, a second cylindrical capacitor positioned coaxially within said first capacitor, with each of said two capacitors comprising at least one convolution of inner and outer conductive plates separated by a layer of dielectric material, and with said second capacitor comprising more convolutions than said first capacitor such that the major surfaces of said conductive plates of both capacitors have substantially the same surface area, the ratio of the inner diameter of said first capacitor to the outer diameter of said second capacitor being such as to provide a given characteristic impedance, and means for coupling said first and second capacitors in a transmission line system having substantially the same characteristic impedance.

4. A high-pass filter including in combination, a first cylindrical capacitor, a second cylindrical capacitor positioned coaxially within said first capacitor, each of said capacitors comprising at least one convolution of inner and outer conductive plates separated by a layer of dielectric material, with the ratio of the inner diameter of said first capacitor to the outer diameter of said second capacitor being such to provide a given characteristic impedance, and means for connecting said inner and outer conductive plates of said first and second cylindrical capacitors to the inner and outer conductors of a coaxial transmission line, said means comprising truncated cones of conductive material, said cones being positioned coaxially at the ends of said first and second cylindrical capacitors.

5. The filter of claim 3 wherein the inner and outer conductive plates of each said cylindrical capacitor are overlapped to the axial direction and joined to the large opening of said truncated cones.

6. The filter of claim 4 wherein the ratio of the diameters of the walls of the truncated cones positioned coaxially at the axial ends of said cylindrical capacitors is such to provide a characteristic impedance substantially the same as the characteristic impedance of said input and output coaxial lines.

References Cited

UNITED STATES PATENTS

| | | | |
|---|---|---|---|
| 2,030,179 | 2/1936 | Potter | 333—73 |
| 2,236,102 | 3/1941 | Koester | 333—73 |
| 2,392,664 | 1/1946 | Gurewitsch | 333—73 |
| 2,411,299 | 11/1946 | Sloan | 333—73 |
| 2,516,529 | 7/1950 | Raymond | 333—73 |
| 2,577,511 | 12/1951 | Cohn | 333—73 |

ELI LIEBERMAN, *Primary Examiner.*

HERMAN KARL SAALBACH, *Examiner.*

C. R. BARAFF, *Assistant Examiner.*